UNITED STATES PATENT OFFICE.

A. K. EATON, OF ROCHESTER, NEW YORK.

IMPROVEMENT IN TANNING.

Specification forming part of Letters Patent No. 9,181, dated August 10, 1852.

*To all whom it may concern:*

Be it known that I, A. K. EATON, of Rochester, in the county of Monroe and State of New York, have invented certain new and useful Improvements in the Process of Tanning Leather; and I do hereby declare that the following is a full, clear, and exact description of my said invention and of the manner of applying the same.

My invention consists of a combination, with any tanning-liquor, of certain substances which have the effect of facilitating its action, and also of preventing the extractive or other matter of the bark or substance from which the tannin is obtained from acting injuriously upon the leather.

In order to tan hides and other skins by my improved process, they may be first soaked, unhaired, and bated by the usual process.

When the bating is accomplished they are ready for the tanning-liquor, which may be prepared from any vegetable substance from which tannin is usually obtained, by adding to the decoction of the substance certain chemical substances which facilitate the action of the tannin, and at the same time prevent the extractive matter of the decoction from injuring the leather. One of the most convenient sources of tannin is the ordinary terra-japonica or catechu of commerce, and it is especially adapted to my process, as the chemical substances which are mixed with it prevent it from having any injurious effect upon the leather, however strong the decoction be made. To tan with this substance, prepare a solution of one hundred and seventy pounds of japonica in a sufficient quantity of soft water to receive one hundred calf-skins. This solution is best prepared by steeping the japonica in hot water and straining the liquor through a cloth when cold. To this liquor add eleven pounds of sulphate of potash, six pounds of alum (double sulphate of alumina and potash.) The bated skins are immersed in this liquor after the grain has been set by a weak tanning-liquor, a greater or less period, according to their thickness and porosity. Sheep-skins are thoroughly tanned by an immersion of from one to ten hours in the liquor, calf-skins require to be immersed from one to six days, and hides require a proportionately longer period, which varies from six to twenty days.

After the first hundred skins have been tanned there is still much tannin left in the liquor, as well as a part of the alum and the whole of the sulphate of potash. It is therefore brought up to its original tannin strength by the addition of japonica alone, and is employed to tan a succeeding parcel of skins.

In the process above described the sulphate of potash induces so rapid an action of the tannin upon the skin that the extractive matter of the vegetable substance from which the tanning-liquor is made has not time to act. This is peculiarly the case when japonica is the substance employed, as it is well known that if bated skins be submitted to a liquor made from it alone in the ordinary manner they are spoiled, for the catechuic acid injures the animal fiber, while by combining sulphate of potash with the liquor the injurious influence of this acid is prevented. The alum improves the quality of the leather, as a portion of the alumina of the alum combines with the gelatine of the skin, and adds greatly to the impermeability of the leather. Alum is not essential in tanning calf-skins.

If japonica cannot readily be obtained, tanning-liquor may be prepared from sumac, or the various barks generally employed, by adding to the decoction sulphate of potash alone, or sulphate of potash and alum.

Leather tanned by the process above described is remarkable for its pliability, strength, and impermeability. The former of these properties is believed to result from the absence of vegetable extractive matter, the strength results from the fact of the animal fiber being uninjured by the process, and the impermeability is due both to the thorough action of the tannin and to the alumina combined with the leather.

This process of tanning has not only the advantage of producing leather of superior quality, but it has the additional advantage of requiring a comparatively-short time to complete it. This advantage will be appreciated by tanners who have been accustomed to the old methods of tanning by steeping the hides in a liquor of bark alone.

I am aware that various chemical substances have from time to time been employed to quicken the action of the tannin; but all those with which I am acquainted have the effect of injuring the quality of the leather, and thus lessening its marketable value. The substances employed by me are free from these defects, and leather produced is free from efflorescence or other defect which diminishes its market value.

Having thus described my process of tanning leather, what I claim as my invention, and desire to secure by Letters Patent, is—

The combination of sulphate of potash with the tanning-liquor, substantially in the manner and for the purposes herein set forth.

In testimony whereof I have hereunto subscribed my name.

A. K. EATON.

Witnesses:
JOHN L. SMITH,
E. S. RENWICK.